(No Model.)
T. J. ST. LOUIS.
METHOD OF AND MACHINE FOR FINISHING SAWS.
No. 501,742. Patented July 18, 1893.
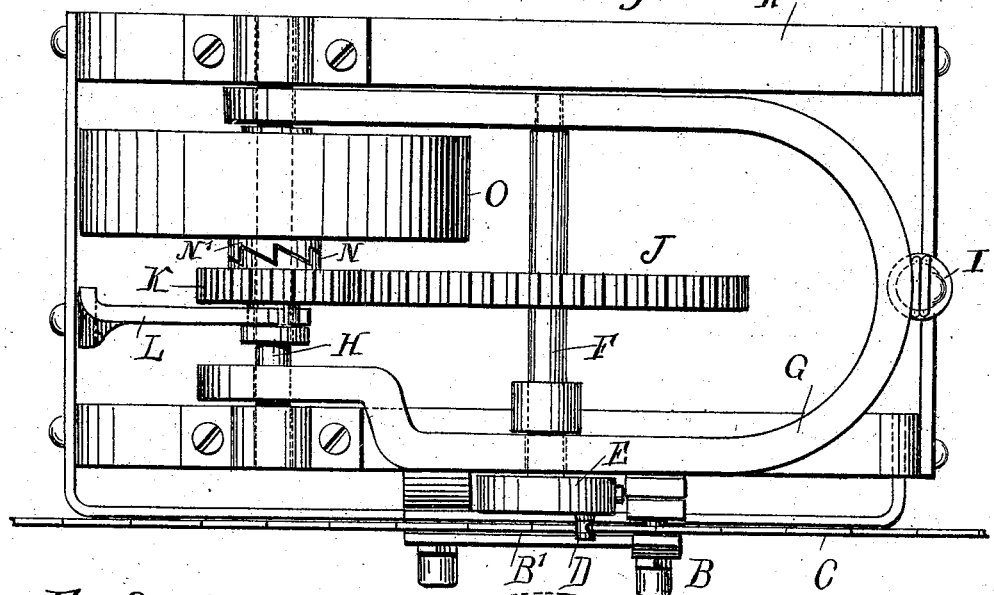
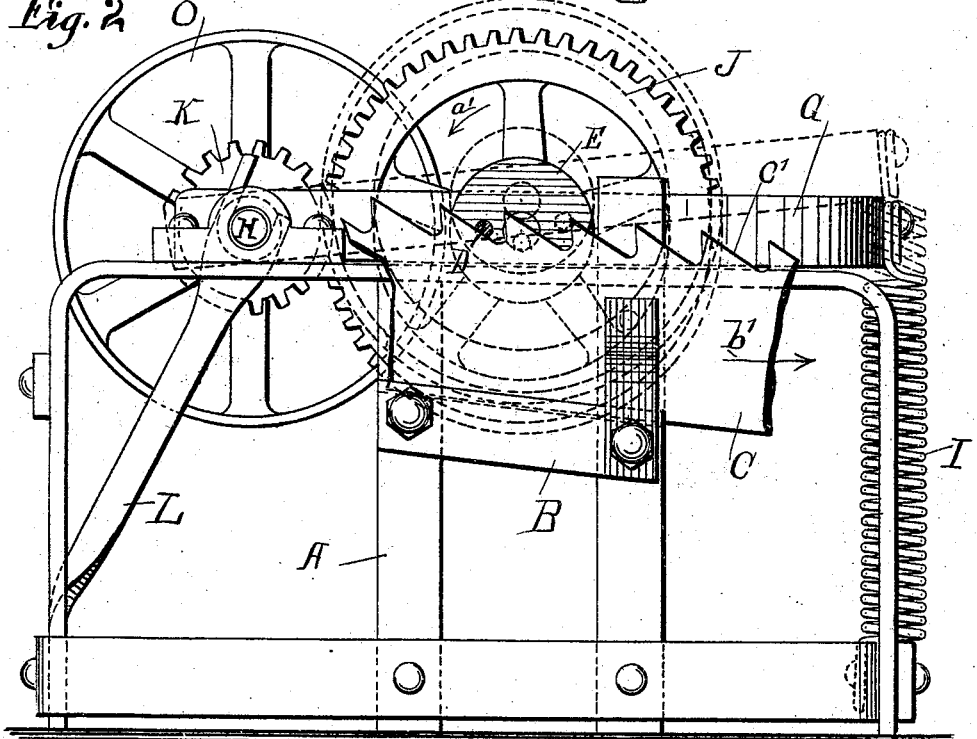
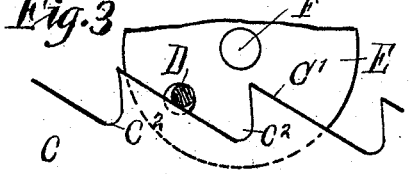
WITNESSES:
INVENTOR
ATTORNEYS.

UNITED STATES PATENT OFFICE.

THOMAS J. ST. LOUIS, OF CADOTT, WISCONSIN.

METHOD OF AND MACHINE FOR FINISHING SAWS.

SPECIFICATION forming part of Letters Patent No. 501,742, dated July 18, 1893.

Application filed November 7, 1892. Serial No. 451,168. (No model.)

*To all whom it may concern:*

Be it known that I, THOMAS J. ST. LOUIS, of Cadott, in the county of Chippewa and State of Wisconsin, have invented a new and Improved Method of and Machine for Finishing Saws, of which the following is a full, clear, and exact description.

The object of the invention is to provide a new and improved method and machine for finishing saws, to prevent their cracking, by removing the sharp edges, destroying the cross creases and breaking up and destroying the case hardening made by the emery wheel in grinding the saw teeth.

The invention consists of subjecting the edge of the tooth to a rolling pressure and simultaneously shifting the saw.

The machine consists principally of a crank disk mounted in yielding bearings, and carrying a die adapted to roll off in the throat of the tooth and to feed the saw forward.

The invention also consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Figure 1 is a plan view of the improvement. Fig. 2 is a side elevation of the same; and Fig. 3 is an enlarged side elevation of the saw and the die for pressing the saw tooth.

The machine is provided with a suitably-constructed frame A, on the front side of which is secured an anvil B, formed on its top with a longitudinally-extending groove B', adapted to be engaged by the back of the saw blade C, so that the teeth C' of the said blade are on top, as plainly shown in Figs. 2 and 3. Each tooth C' is adapted to be engaged by a die D made in the shape of a pin, having a recess in its periphery so as to straddle the top edge of the saw tooth all along the back of the tooth, and the throat $C^2$, the said pin at the same time serving to shift the saw blade longitudinally on the anvil B. For this purpose, the die D is secured in a crank disk E, held on a transversely-extending shaft F, mounted to turn in suitable bearings in a frame G mounted to swing, and having its fulcrum on the main driving shaft H, journaled in suitable bearings on the frame A. The shaft frame G rests on top of the main frame A and is held in this position by a spring I, attached to the lower part of the frame A at one end, and connected with the free end of the said shaft frame G.

In order to impart a rotary motion to the shaft F, I provide the latter with a gear wheel J in mesh with a pinion K, mounted to turn with and to slide laterally on the main driving shaft H, the said pinion being adapted to be shifted by a shifting lever L of any approved construction. On the hub of the pinion K is formed a clutch N to engage clutch teeth N' on the hub of the driving pulley O, secured on the main driving shaft H. Now, when the latter is rotated and the clutches are in engagement as shown in Fig. 1, then a rotary motion is given by the pinion K and gear wheel J to the shaft F, so that the latter rotates in the direction of the arrow $a'$ shown in Fig. 2. This movement of the shaft F causes the crank disk E to move the die D in contact with the top edge of the saw tooth, so that the die presses onto the top edge, rolls off on the same, to finally engage the throat $C^2$ and roll in the same, at the same time pushing the saw forward in the direction of the arrow $b'$, on the further rotation of the crank disk E.

It is understood that as the saw blade C is supported on the anvil B, the yielding frame G will naturally swing upward according to the downward movement of the die D on the rotation of the crank disk E, it being however, understood that the said die is pressed into contact with the top edge of the saw tooth and its throat by the force of the spring I tending to hold the shaft frame G on top of the main frame A.

The distance of the die D from the center of the crank disk E is such that on every revolution of the shaft F the die D acts on a saw tooth, as above described, shifts the saw blade forward a sufficient distance, to engage at the next revolution of the shaft F, the adjacent saw tooth, to act on the same in the same manner as above described.

It is further understood that when the teeth of a saw blade are formed by grinding with an emery wheel, a segmental recess forming the throat of the saw is left by the emery wheel, the said segmental recess corresponding to the diameter of the emery wheel. The latter, in grinding the saw, leaves sharp and rough edges and cross creases, and also causes more or less case hardening which is principally the cause of the cracking of saws when in use. Now, with the above described method and the machine as described, the die D presses on the tooth so as to round and smooth the edges thereof and at the same time break up and destroy the case hardening and draw the fiber in the outer edge of the tooth lengthwise. The cross creases usually formed by the emery wheel are also destroyed, and the uniform pressure given to the top edge and throat of the saw tooth causes an equal tension in the particles composing the saw, at the particular points where the saw is most liable to crack.

Having thus fully described my invention, I claim as new and desire to secure by Letters Patent—

1. The method of finishing saws which consists in applying a rolling pressure to the throats of the teeth only, beginning on the back of one tooth in rear of the point and continuing the pressure down the tooth and into the base of the throat, substantially as set forth.

2. The method of finishing saws consisting in subjecting the throat of the tooth to a rolling pressure beginning upon the back of one tooth and continuing therealong to the base line of the tooth and thence upwardly on the forward edge of the succeeding tooth and by the rolling pressure in said upward movement feeding the saw the distance of one tooth, substantially as set forth.

3. A machine for finishing saw teeth comprising a die eccentric to its axis and so mounted as to roll off the throat of the teeth of the saw blade, substantially as set forth.

4. A machine for finishing saw teeth comprising a die eccentric to its axis, grooved on its working edge and so mounted as to roll off the throat of the teeth of the saw blade as it is carried around with its shaft, substantially as set forth.

5. A machine for finishing saws, comprising an anvil for supporting the saw blade, a crank disk carrying a die adapted to roll off on the saw teeth, and to feed the saw forward on the anvil, and a yieldingly mounted bearing for the shaft of the said crank disk, substantially as shown and described.

6. A machine for finishing saws, comprising an anvil for supporting the saw blade, a crank disk carrying a die adapted to roll off on the saw teeth, and to feed the saw forward on the anvil, a yieldingly-mounted bearing for the shaft of the said crank disk, and means, substantially as described, for imparting a rotary motion to the said crank disk, as set forth.

7. A machine for finishing saw teeth comprising a frame a drive shaft journaled therein, a vertically yielding ∩-shaped frame loosely mounted at its ends on said shaft a die shaft journaled in said frame and geared to the drive shaft, a die secured eccentrically to the outer end of the shaft to roll off the throat of the teeth of the saw blade and a support for the back of the saw on the side of the frame beneath the die, substantially as set forth.

THOMAS J. ST. LOUIS.

Witnesses:
FRANK E. WATSON,
E. J. WYATT.